United States Patent
Watanabe et al.

(10) Patent No.: US 12,124,475 B2
(45) Date of Patent: Oct. 22, 2024

(54) BLOCKCHAIN SYSTEM, APPROVAL TERMINAL, USER TERMINAL, HISTORY MANAGEMENT METHOD, AND HISTORY MANAGEMENT PROGRAM

(71) Applicant: Nippon Telegraph and Telephone Corporation, Tokyo (JP)

(72) Inventors: Hiroki Watanabe, Musashino (JP); Tatsuro Ishida, Musashino (JP); Shigenori Ohashi, Musashino (JP); Shigeru Fujimura, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 336 days.

(21) Appl. No.: 17/293,583

(22) PCT Filed: Oct. 30, 2019

(86) PCT No.: PCT/JP2019/042658
§ 371 (c)(1),
(2) Date: May 13, 2021

(87) PCT Pub. No.: WO2020/100602
PCT Pub. Date: May 22, 2020

(65) Prior Publication Data
US 2022/0004562 A1     Jan. 6, 2022

(30) Foreign Application Priority Data
Nov. 13, 2018 (JP) ................. 2018-213190

(51) Int. Cl.
*G06F 16/23* (2019.01)
*G06F 16/27* (2019.01)
(Continued)

(52) U.S. Cl.
CPC .......... *G06F 16/27* (2019.01); *G06F 16/2379* (2019.01); *G06F 16/278* (2019.01); *G06F 21/64* (2013.01); *H04L 9/50* (2022.05)

(58) Field of Classification Search
CPC .... G06F 16/27; G06F 16/2379; G06F 16/273; G06F 16/2275; G06F 16/278; G06F 21/64; H04L 9/50
See application file for complete search history.

(56) References Cited

U.S. PATENT DOCUMENTS 11,539,527 B2 * 12/2022 Jayachandran ......... G06F 21/64
2017/0287090 A1 * 10/2017 Hunn ...................... H04L 63/12
(Continued)

OTHER PUBLICATIONS

Yasusaka et al., "A Privacy-preserving Pre-Consensus Protocol for Blockchain," Computer Security Symposium 2018, Oct. 2018, pp. 850-857, (English Abstract Only).

(Continued)

*Primary Examiner* — Marcin R Filipczyk
(74) *Attorney, Agent, or Firm* — Fish & Richardson P.C.

(57) ABSTRACT

A history of data can be easily traced on a blockchain. A blockchain system includes a user terminal 1 and an approval terminal 2. The user terminal 1 includes a transaction issuing unit 13 that issues a transaction for updating a value of a variable of a smart contract. The approval terminal 2 includes a block generation unit 153 that generates a block including the transaction and updates the value of the variable, and reflects the block and an update block number of the block in which the value of the variable is updated to a distributed ledger 11 of a terminal of the blockchain system.

4 Claims, 6 Drawing Sheets

(51) Int. Cl.
G06F 21/64 (2013.01)
H04L 9/00 (2022.01)

(56) References Cited

U.S. PATENT DOCUMENTS

2018/0109516 A1* 4/2018 Song .................... H04L 9/3239
2020/0007558 A1* 1/2020 Inokuchi ................ H04L 63/20
2020/0143365 A1* 5/2020 Nakamura .......... G06F 16/1834
2021/0160069 A1* 5/2021 Watanabe .............. G06F 21/64

OTHER PUBLICATIONS

Github.com, [Online], "JavaScript API," Oct. 7, 2018, retrieved from URL<https://github.com/ethereum/wiki/wiki/javascript-API#contract-methods>, 58 pages.

PCT International Search Report in International Appln. No. PCT/JP2019/042658, dated Jan. 24, 2020, 6 pages (with English Translation).

Sato, "New IoT Technology, Blockchains, of course," Interface, Aug. 2018, 44(8):29-39.

* cited by examiner

| FIELD | DESCRIPTION |
|---|---|
| DESTINATION | ADDRESS OF CONTRACT |
| PAYMENT AMOUNT | AMOUNT OF MONEY (FEE) PAID TO EXECUTE CONTRACT |
| DATA | DATA FOR DESIGNATING EXECUTION OF FUNCTION THAT PROVIDES FUNCTION INDICATING THAT "OWNERSHIP OF TOKEN IS MOVED TO DESIGNATED ADDRESS" INSIDE CONTRACT IS SET ID OF TOKEN AND ADDRESS OF USER B ARE DESIGNATED AS ARGUMENTS |
| ELECTRONIC SIGNATURE | SIGNATURE VALUE SIGNED WITH PRIVATE KEY OF USER A |

BLOCKCHAIN SYSTEM, APPROVAL TERMINAL, USER TERMINAL, HISTORY MANAGEMENT METHOD, AND HISTORY MANAGEMENT PROGRAM

CROSS-REFERENCE TO RELATED APPLICATIONS

This application is a National Stage application under 35 U.S.C. § 371 of International Application No. PCT/JP2019/042658, having an International Filing Date of Oct. 30, 2019, which claims priority to Japanese Application Serial No. 2018-213190, filed on Nov. 13, 2018. The disclosure of the prior application is considered part of the disclosure of this application, and is incorporated in its entirety into this application.

TECHNICAL FIELD

The present invention relates to a technology for managing a history of a smart contract type blockchain.

BACKGROUND ART

Mechanisms that can guarantee reliability without requiring centralized management are becoming popular centering on Bitcoin, digital cryptocurrency. In a structure called a blockchain, reliability of information to be exchanged is guaranteed by processing of reaching agreement built in a distributed network, and soundness of the mechanism is kept by preventing frauds such as falsification or double spending in an entire system.

In a blockchain, pieces of handled information (transaction) among participants are summarized in a unit called a "block" and individual blocks are linked in the form of a chain and are managed in chronological order. Approval of a new block is gained through an agreement algorithm in a distributed network such as Proof of Work. The approval of a new block indicates agreement of handled information recorded in the block in the entire system.

A ledger of a series of pieces of handled information managed using the blockchain is called a "distributed ledger", and each terminal participating in a network has the same distributed ledger. In recent years, blockchain-based technologies of registering advanced script codes in distributed ledgers and obtaining agreement of execution of the script codes and results of the execution have been developed. For example, a blockchain-based technology called Ethereum has a distributed ledger in which a script code is executed using a transaction as an input, a result of the execution is stored in a key value type store (called a state DB) with a tree structure, and a representative value of the store at that time is also recorded in a block. A script code registered on a blockchain and registered and executed in each terminal in this way is called a "smart contract."

In a smart contract type blockchain, each block and a state DB of a smart contract at a time point of the block are associated and managed (see NPL 1).

CITATION LIST

Non Patent Literature

[NPL 1] "JavaScript API.ethereum/wiki Wiki GitHub," https://github.com/ethereum/wiki/wiki/JavaScript-API #contract-methods

SUMMARY OF THE INVENTION

Technical Problem

In a data structure of a blockchain, it is easy to designate a block number and refer to a state at a block time point. However, it is difficult to know how a value of the state of a block has transitioned at which block in the past. In particular, this problem is important in view of ensuring traceability of information.

For example, when advanced searching and tracing is performed to trace a change in a certain value of a state, a method is conceivable, in which an external database such as RDBMS is prepared, all of pieces of data extracted from a blockchain are dropped to the external database, an index is constructed on the external database, and desired data is searched and traced. However, to construct and keep a search system using the external database, high costs are required to general users.

The present invention has been devised in view of the foregoing problems and an objective of the present invention is to provide a technology capable of easily tracing a history of data on a blockchain.

Means for Solving the Problem

To achieve the foregoing objective, according to an aspect of the present invention, a blockchain system includes a user terminal and an approval terminal. The user terminal includes a transaction issuing unit that issues a transaction for updating a value of a variable of a smart contract. The approval terminal includes a block generation unit that generates a block including the transaction and updates the value of the variable, and reflects the block and an update block number of the block in which the value of the variable is updated to a distributed ledger of a terminal in the blockchain system.

According to another aspect of the present invention, an approval terminal approves a transaction in a blockchain system and includes: a reception unit configured to receive the transaction for updating a value of a variable of a smart contract; and a block generation unit configured to generate a block including the transaction and update the value of the variable, and to reflect the block and an update block number of the block in which the value of the variable is updated to a distributed ledger of a terminal of the blockchain system.

According to still another aspect of the present invention, a user terminal in a blockchain system includes: a distributed ledger of a blockchain; a transaction issuing unit configured to issue a transaction for updating a value of a variable of a smart contract; and a history searching unit configured to acquire the update block number in which the value of the variable is updated from the distributed ledger, designate a searching block number calculated from the update block number, and acquire the value of the variable of the smart contract and the update block number in the block at a time point of the searching block number from the distributed ledger.

According to still another aspect of the present invention, provided is a history management method of managing a history of a blockchain. The method includes: issuing a transaction for updating a value of a variable of a smart contract by a user terminal; generating a block including the transaction and updating the value of the variable by an approval terminal; and reflecting the block and an update block number of the block in which the value of the variable is updated to a distributed ledger of a terminal connected to a blockchain network for the synchronization by the approval terminal.

According to still another aspect of the present invention, a smart contract registration program causes a computer to function as the approval terminal.

Effects of the Invention

According to the present invention, it is possible to provide a technology capable of easily tracing a history of data on a blockchain.

DESCRIPTION OF EMBODIMENTS

Hereinafter, embodiments of the present invention will be described with reference to the drawings.

Figure 1:
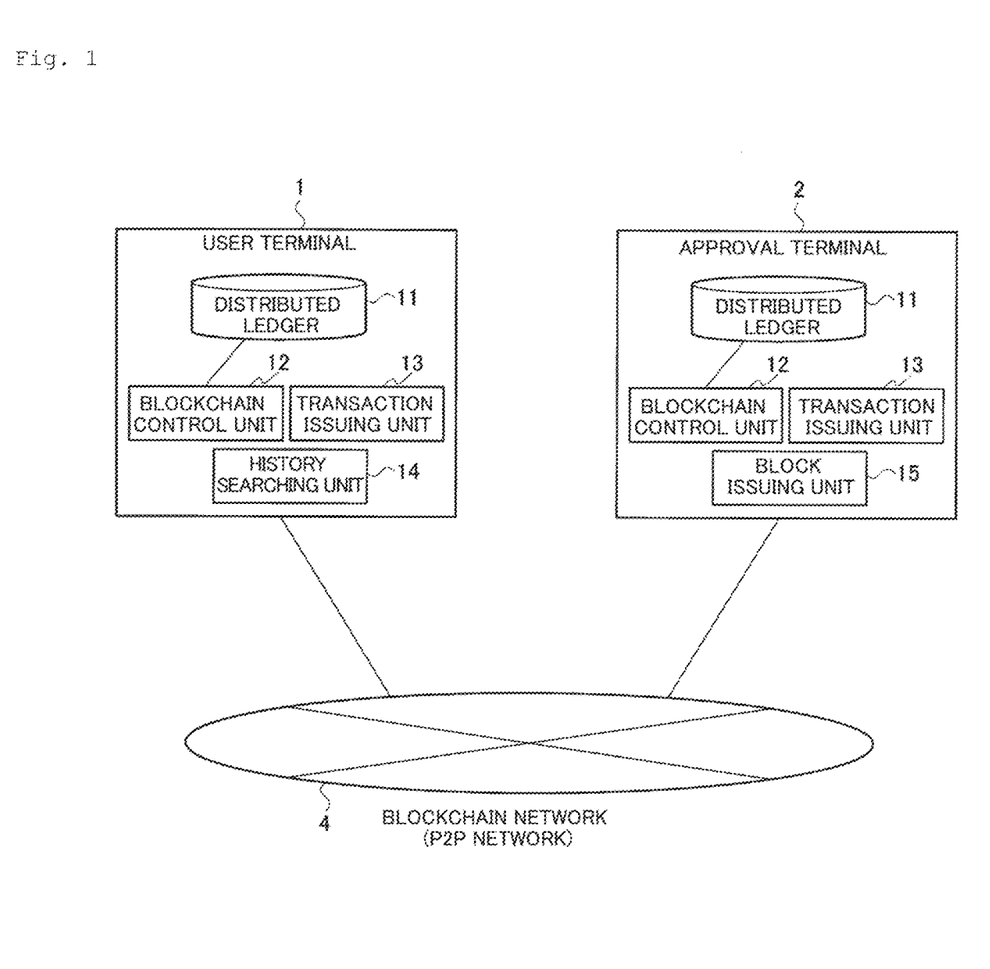
FIG. 1 is a diagram illustrating an overall configuration of a blockchain system according to an embodiment of the present invention.

FIG. 1 is a diagram illustrating an overall configuration of a blockchain system according to an embodiment of the present invention. The blockchain according to the embodiment is a smart contract type blockchain and uses Ethereum which is one of blockchain-based technologies. Ethereum is an application development platform for using the blockchain as a distributed ledger recording a state transition. Here, the present invention is not limited to Ethereum and a blockchain other than Ethereum may be used.

The blockchain system illustrated in FIG. 1 includes a user terminal 1 and an approval terminal 2. The terminals 1 and 2 are connected to a blockchain network 4 (hereinafter referred to as a "network") which is a P2P network in an autonomous distributed manner. In addition to the illustrated terminals 1 and 2, a plurality of terminals are connected to the network 4. For example, a plurality of user terminals 1 and a plurality of approval terminals 2 may be connected to the network 4. Each of the terminals connected to the network 4 includes a distributed ledger 11, a blockchain control unit 12, and a transaction issuing unit 13 so as to verify pieces of data and transactions recorded in the distributed ledger 11 one another, and keep a system.

The user terminal 1 is a terminal (node) that is used by a user who uses a blockchain and a smart contract. The user terminal 1 includes the distributed ledger 11, the blockchain control unit 12, the transaction issuing unit 13, and a history searching unit 14.

The distributed ledger 11 stores the latest blockchain in almost real time by being loosely synchronized with all terminals connected to the network 4 via the blockchain control unit 12. In the distributed ledger 11 according to the embodiment, a blockchain and a data set managed in the blockchain are stored.

The blockchain control unit 12 keeps the system of the blockchain by autonomously and decentrally cooperating with the terminals connected to the network 4. The blockchain control unit 12 accesses the distributed ledger 11 to read or update the blockchain and the data set of the distributed ledger 11.

The transaction issuing unit 13 issues a transaction to the network 4. In the embodiment, the transaction issuing unit 13 issues a transaction in which a value of a state (a variable) of the smart contract is updated.

The history searching unit 14 acquires, from the distributed ledger 11 of the user terminal, an update block number of a block in which a value of the state of the smart contract is updated, designates a search block number calculated from the update block number, and acquires the value of the state of the smart contract and the update block number in the block at the time point of the search block number from the distributed ledger 11. The history searching unit 14 accesses the distributed ledger 11 via the blockchain control unit 12.

The approval terminal 2 is, for example a terminal which is used by a transaction verifier called a miner, collects transactions transmitted to the network 4, verifies validity, and then generates a block through approval work. The approval terminal 2 includes the distributed ledger 11, the blockchain control unit 12, the transaction issuing unit 13, and a block issuing unit 15. The distributed ledger 11, the blockchain control unit 12, and the transaction issuing unit 13 of the approval terminal 2 are similar to the distributed ledger 11, the blockchain control unit 12, and the transaction issuing unit 13 of the user terminal 1.

The block issuing unit 15 verifies a transaction issued on the network 4 and attempts to generate a block in accordance with a consensus algorithm (an agreement algorithm) for generating a block, such as Proof of Work.

Figure 2:
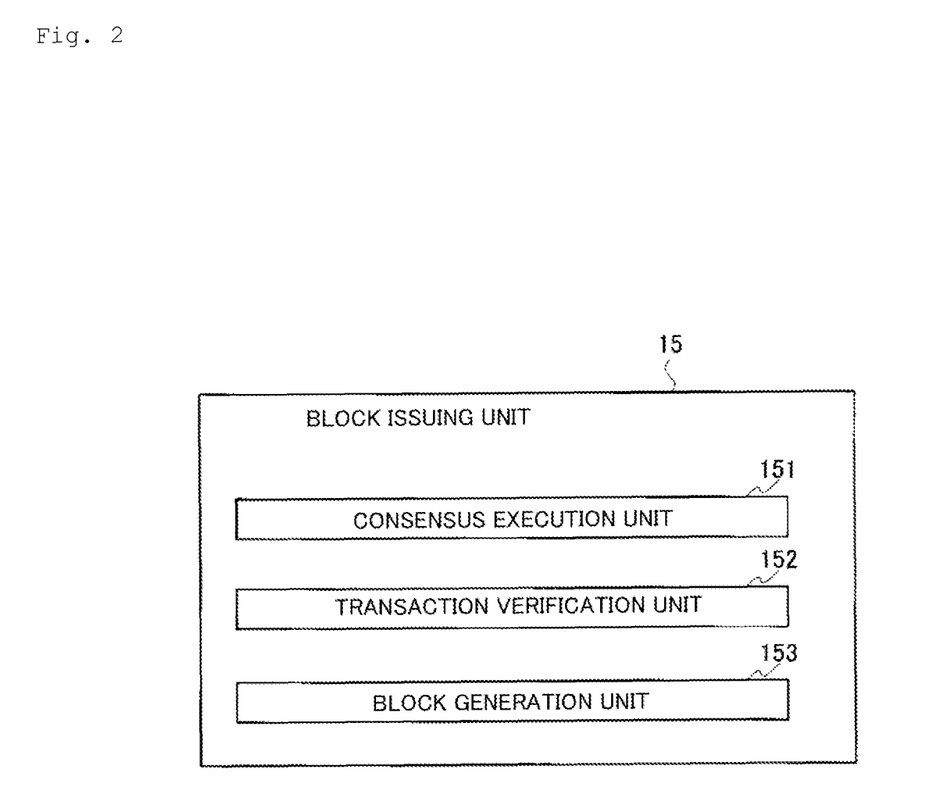
FIG. 2 is a diagram illustrating a configuration of a distributed ledger.

FIG. 2 is a diagram illustrating a configuration of the block issuing unit 15 included in the approval terminal 2. The illustrated block issuing unit 15 includes a consensus execution unit 151, a transaction verification unit 152, and a block generation unit 153.

The consensus execution unit 151 performs calculation necessary for consensus (agreement), such as hash calculation. As the consensus algorithm, another consensus algorithm for generating a block, such as Proof of Stake in which a possession coin amount is used as a resource or PBFT which is an agreement algorithm in a byzantine fault, may be used in addition to Proof of Work used in Bitcoin.

After receiving a transaction from the network 4, the transaction verification unit 152 verifies the transaction such as the verification on the validity of an electronic signature of the received transaction.

The block generation unit 153 collects the transactions issued on the network 4 within a predetermined time and generates one block. In other words, if the verification by the transaction verification unit 152 is successful, the block generation unit 153 generates the block including the transaction and reflects the generated block to the distributed ledgers 11 of all the terminals connected to the network 4.

The block generation unit 153 according to the embodiment generates the block including the transaction in which a value of the state (the variable) of the smart contract is updated and updates the value of the state, and reflects the block and an update block number of the block in which the value of the state is updated to the distributed ledgers of the terminals of the blockchain system.

Specifically, the block generation unit 153 updates a state DB which is one of data sets of the distributed ledger 11 of the own terminal based on the transaction in which the value of the state of the smart contract is updated and sets a hash value of the updated state DB in a block header of the generated block. That is, the block generation unit 153 sets the value of the state updated in accordance with the transaction and the update block number of the block in which the updating is performed to the state DB.

Figure 3:
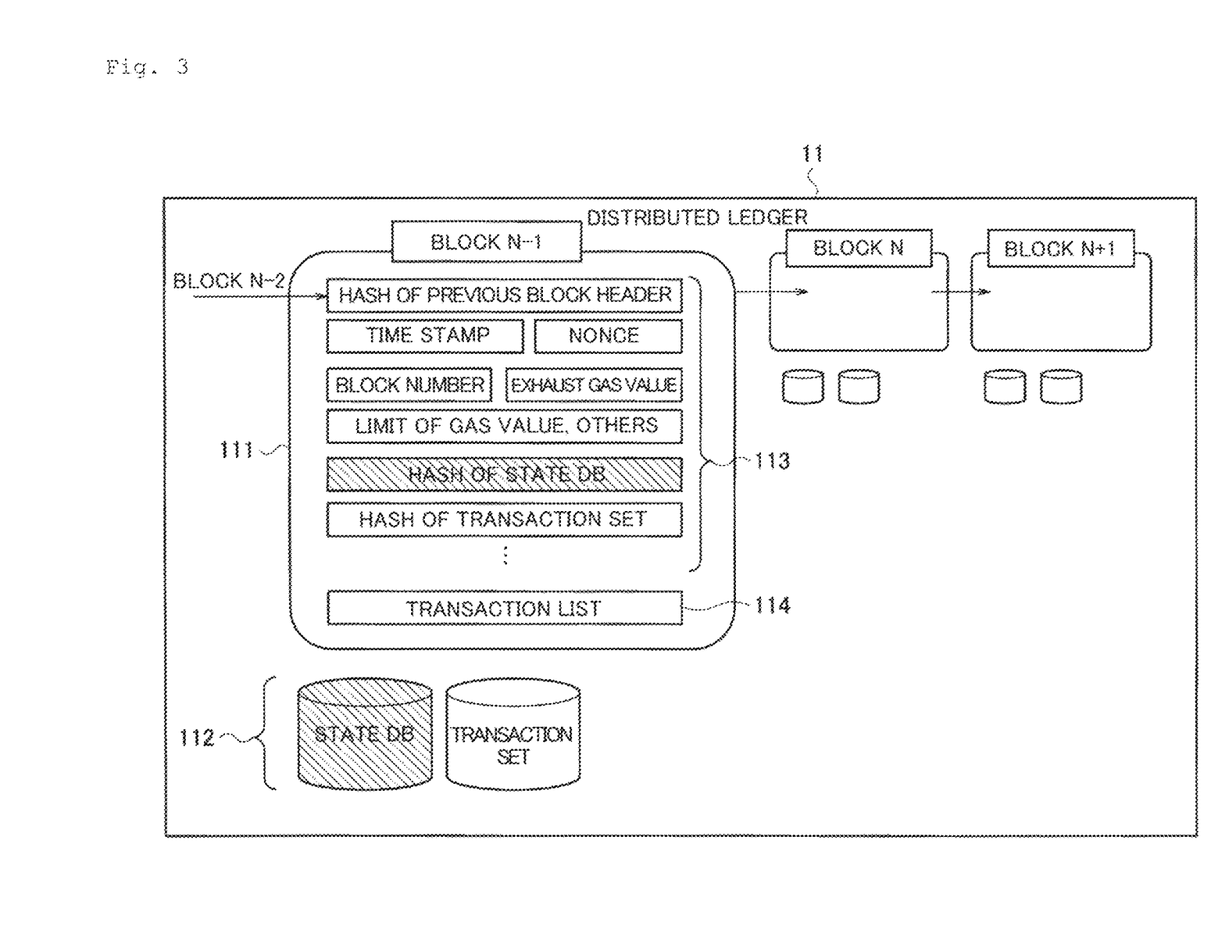
FIG. 3 is a diagram illustrating a configuration of a block issuing unit.

FIG. 3 is a diagram illustrating a configuration of the distributed ledger 11 of each terminal. The distributed ledger 11 according to the present embodiment includes a blockchain formed by a plurality of blocks 111 and a data set 112 managed in correspondence with each block.

The block 111 includes a block header 113, a transaction list 114 and the like. In the block header 113, a summary of all the distributed ledgers 11 at the time point of the block is set. In the illustrated example, the block header 113 is set with summary values (a hash value of the state DB, a hash value of the transaction set, and the like) of the data set 112 as a snapshot at a certain time point of the data set 112. For example, if a data set is stored with a tree structure such as a merkle tree, a root hash of the merkle tree is set as the summary values. A transaction list 114 is a list of transactions included in the block 111.

The use or purpose of the data set 112 is not limited. The illustrated distributed ledger 11 includes the state DB and a transaction set DB as the data set 112.

The state DB is a DB for managing a value or a state of a state (a variable) of a smart contract at a time point of a certain block. In the state DB, a bytecode of the smart contract is stored. In the present embodiment, information is recorded in the state DB in a data unit called a token. Here, the token is a data structure expressed with the smart contract, includes parameters such as at least a "token ID" and an "address of an owner," and indicates data in which transfer of the token is managed on a blockchain by authority of the owner. That is, in the state DB according to the embodiment, a value of a state (for example, an address of the owner or the like) of the smart contract is stored for each token.

The block generation unit 153 of the approval terminal 2 sets, to the state DB according to the present embodiment, an update block number which is a block number of a block in which the value of the state is updated in association with the value of the updated state for each token. The state DB functions as a key-value store (KVS) and outputs the value of the state of the token and the update block number when identification information (for example, a token ID) for uniquely designating a token is input.

In Ethereum, after the bytecode of the smart contract is registered in the distributed ledger 11 (the state DB), identification information indicating the smart contract is given. Since a transaction can be transmitted to the identification information, the identification information of the smart contract is also called an address. A difference from remittance to an address of a user is that the smart contract is executed after a transaction is transmitted to the address of the smart contract.

The transaction set DB is a DB indicating a set of transactions at a time point of a certain block. The set of the transaction means a merkle tree formed by all of the transactions at the time point of the certain block.

Next, processing will be described in which the approval terminal 2 grants, to the state, an update block number at the time of updating when a value of the state of the state DB is updated.

Figure 4:
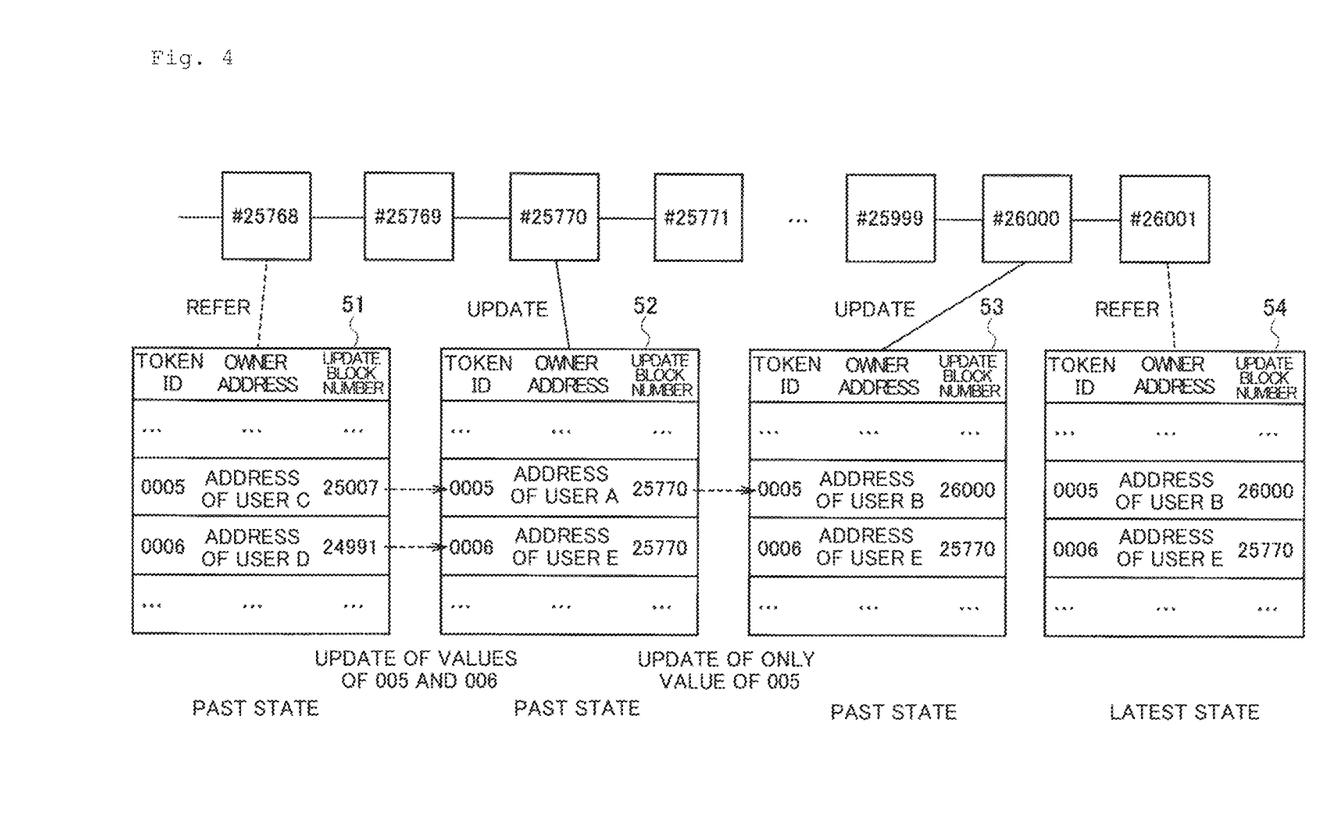
FIG. 4 is an explanatory diagram illustrating a method of setting an update block number of a state DB.

FIG. 4 is a schematic diagram illustrating processing of granting an update block number to a value of a state. In the illustrated example, it is assumed that blocks with block numbers up to #26001 are registered in the distributed ledger 11 of each terminal.

In the distributed ledger 11 according to the embodiment, as described above, the block and the state DB are held in association with each other. In the illustrated example, a state DB 51 of a block #25768, a state DB 52 of a block #25770, a state DB 53 of a block #26000, and a state DB 54 of the block #26001 are illustrated.

Each illustrated state DB includes a token ID, an owner address, and an update block number for each token. In the embodiment, the token ID is used as a key of a state, but the key of the state is not limited to the token ID. The token may be a non-fungible token or may be a fungible token.

The owner address is a state (a variable). As the owner address, an address of an owner of the token at a time point of a corresponding block is set. As the update block number, a block number when the owner of the token is updated (changed) is set.

For example, referring to the state DB 51 of the block #25768, with regard to a token ID:0005, it can be known that an owner is a user C and an update block number including a transaction in which the owner is updated to the user C is #25007. With regard to a token ID:0006, it can be known that an owner is a user D and an update block number including a transaction in which the owner is updated to the user D is #24991.

Subsequently, in a block #25769, it is assumed that the owner addresses of token ID: 0005 and token ID: 0006 are not updated by a transaction included in the block. In this case, in the update block numbers of the token ID: 0005 and token ID: 0006 of a state DB (not illustrated), a block number set to the update block number of the immediately previous block #25768 is remained and continuously set. In the owner addresses of the token ID: 0005 and token ID: 0006, an address set in the owner address of the immediately previous block is remained and continuously set.

By a transaction included in the block #25770, the owner addresses of token ID: 0005 and token ID: 0006 are updated. In this case, the approval terminal 2 updates the owner addresses of token ID: 0005 and token ID: 0006 and updates the update block numbers. Specifically, the approval terminal 2 sets the block number (#25770) of the block to the update block numbers of the token ID: 0005 and token ID: 0006.

In blocks from #25771 to #25999, it is assumed that the owner addresses of token ID: 0005 and token ID: 0006 are not updated by a transaction included in each block. In this case, a block number set to the update block number of the immediately previous block is remained and is continuously set. That is, in the state DBs of blocks from #25771 to #25999, with regard to the token ID: 0005 and token ID: 0006, the same owner address and update block number as those of the state DB 52 of the block #25770 is remained and continuously set.

By a transaction included in the block #26000, the owner address of token ID: 0005 is updated. In this case, the approval terminal 2 updates the owner address of token ID: 0005 and updates the update block number. Specifically, the approval terminal 2 sets the block number (#26000) of the block to the update block numbers of token ID: 0005. With regard to token ID: 0006, the approval terminal 2 sets the same owner address and update block number as those of the immediately previous block.

In this way, in the embodiment, the update block number is set along with the value of the state (the owner address) of the key (the token ID). Thus, in the embodiment, the user terminal 1 can acquire the finally changed update block number with reference to the latest state DB 54. For example, in the case of token ID: 0006, the block #25770 can be acquired.

Then, the user terminal 1 designates a searching block number calculated from the update block number and acquires the owner address and the update block number designated with the searching block number. For example, a block number obtained by subtracting 1 from the update block number is set as the searching block number. For example, in the case of token ID: 0006, the searching block number #25769 obtained by subtracting 1 from the update block number #25770 is designated and the owner address (user D) and the update block number (#24991) set with the block number are acquired. In this way, in the embodiment, by tracking only the blocks near the block in which the value of the state has been changed, it is possible to considerably reduce the searching cost and easily acquire a change history of the value of the state.

Figure 5:
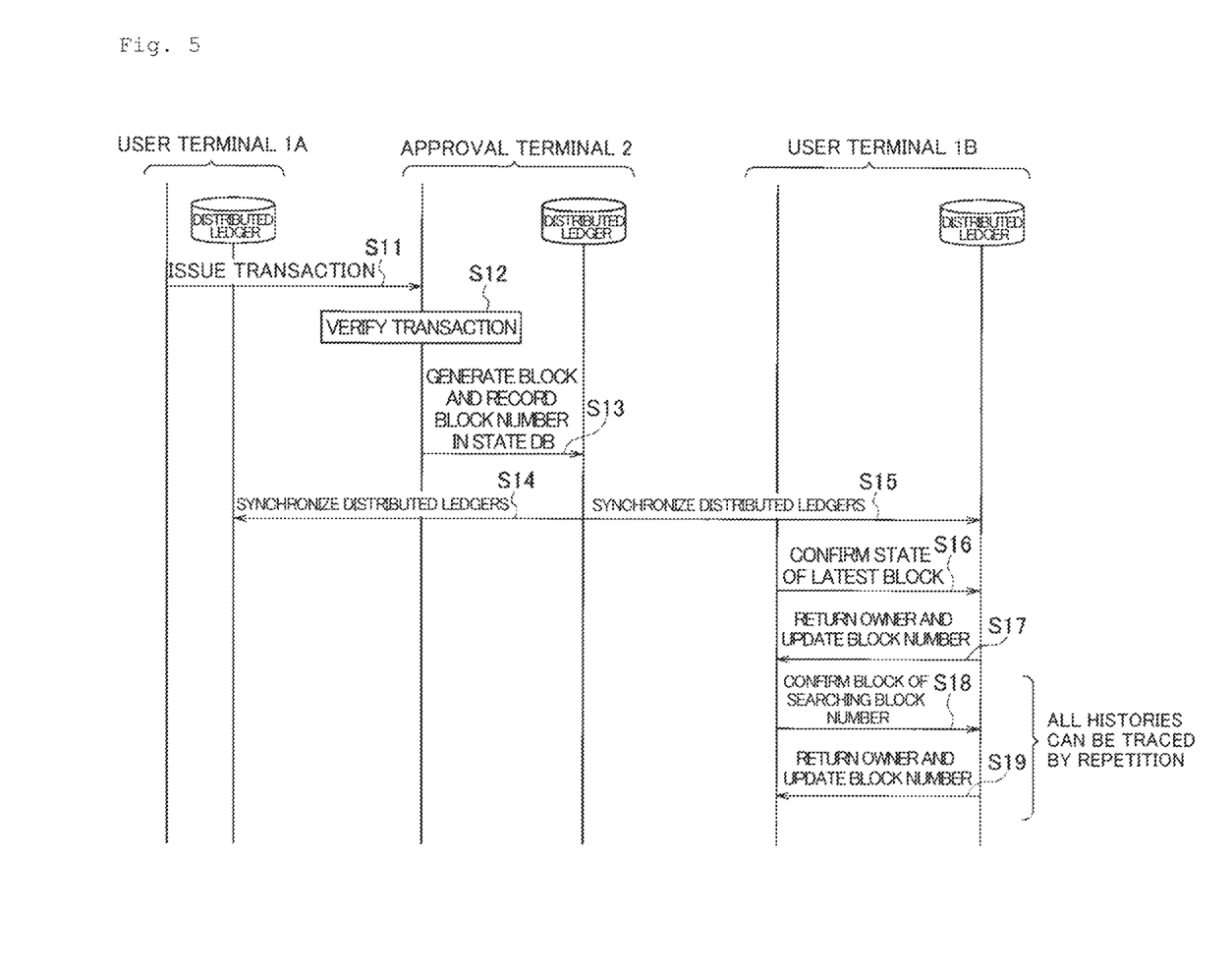
FIG. 5 is a sequence diagram illustrating block generation and history searching.

FIG. 5 is a sequence diagram illustrating block generation and history searching according to the embodiment.

The illustrated processing is processing in which a user A moves (transfers) a token to a user B and a history of the token received from the user A by the user B is searched for.

A user terminal 1A of the user A generates and issues a transaction for moving a predetermined token from the user A to the user B (S11). Specifically, the user terminal 1A broadcasts the transaction on the network 4. Accordingly the transaction is propagated to all of the terminals connected to the network 4.

Figure 6:
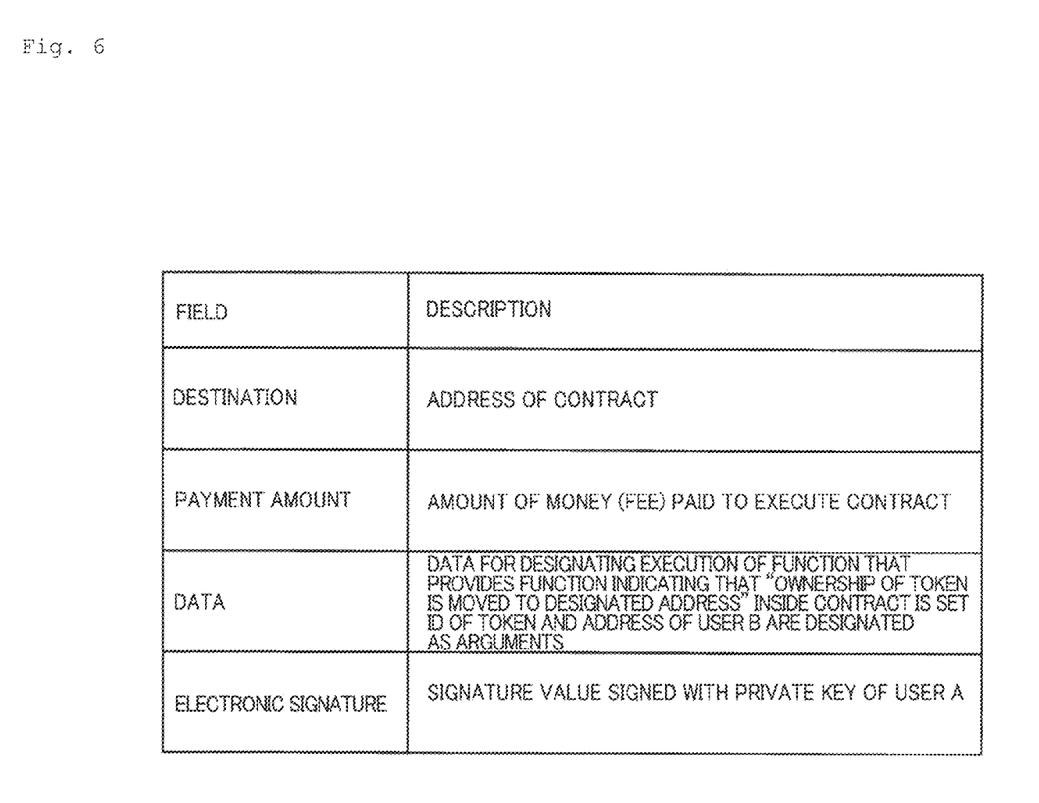
FIG. 6 is a diagram illustrating an example of a transaction.

FIG. 6 is a diagram illustrating an example of the transaction of S11. The illustrated transaction has a destination, a payment amount, data, and an electronic signature. In the destination, an address of a smart contract is set. In the payment amount, an amount of money (fee) paid to execute the smart contract is set.

For the data, data for designating execution of a function that provides a function that "ownership of a predetermined token is moved to a designated address" in the smart contract is set. An ID of the token and an address of the user B are designated as arguments. In the electronic signature, a signature value in which a transaction is signed with a private key of the user A who is an issuer of the transaction is set.

The approval terminal 2 (the block issuing unit 15) verifies (mines) the transaction transmitted in S11 (S12). Then, the approval terminal 2 summarizes the transaction with other transactions generated within a predetermined time to generate one block. The block is added to the blockchain of the own distributed ledger 11 through nonce mining (S13). If the approval terminal 2 successfully generates the block, the transaction transmitted in S11 is confirmed (approved).

Here, the approval terminal 2 updates each DB of the data set of the own distributed ledger 11 based on the transaction of S11 and sets the hash value of each updated DB to the block header of the generated block.

When the state DB of the data set is updated, the approval terminal 2 updates and changes an address of an owner to whom the ownership of the token has been moved in accordance with the transaction of S11, from the address of the user A to the address of the user B. In the embodiment, the approval terminal 2 stores the block number of the block in which the owner address is updated in the state DB. For example, as illustrated in the state DB 54 of FIG. 4, if the token ID of the token of which the ownership is moved is 0005 and the generated block is #26000, the approval terminal 2 sets the address of the user B to the owner address and sets the number #26000 of the block in the update block number in the state DB.

The approval terminal 2 sets the hash value of the updated state DB to the block header of the generated block. S13 is processing performed by a terminal that succeeds in generating the block the earliest among all the terminals connected to the network.

Then, through the loose synchronization among the terminals, the block including the transaction transmitted in S11 is reflected to the distributed ledgers 11 of all of the terminals connected to the network 4 (S14 and S15). That is, the blockchain control units 12 of all the terminals add the block including the transaction of S11 to the distributed ledger 11 held by the own terminal. The blockchain control units 12 of all the terminals update the state DB of the data set of the own distributed ledger 11 based on the transaction included in the block similarly to the approval terminal 2.

Subsequently, when the user B who has the ownership of the token searches for a past history of the token transferred from the user A, processing at or after S16 is performed. Specifically, a user terminal 1B inquires of the own distributed ledger about the owner address (the value of the state) of the token in the latest block (S16) and acquires the owner address and the update block number of the latest block from the distributed ledger (S17).

For example, if the latest block is the block #26001 illustrated in FIG. 4 and the token ID of an inquiring target is 0005, the user terminal 1B acquires the address of the user B who is an owner and #26000 as the update block number with reference to the state DB 54 of the own distributed ledger. Thus, the user B can confirm that the owner of the current token is herself or himself and the updating of the owner is performed in the block #26000.

If a user B desires to search for the past history of the token, processing of S18 and S19 is repeatedly performed. That is, the user terminal 1B calculates the searching block number based on the update block number acquired in S17. Here, the block number obtained by subtracting "1" from the update block number is set as a searching block number. Then, the user terminal 1B designates the searching block number and inquires of the own distributed ledger about the owner address of the token in the searching block number (S18), and acquires the owner address and the update block number in the designated block from the distributed ledger (S19).

For example, if the update block number acquired in S17 is #26000 and the token ID is 0005 in the state DB of FIG. 4, the user terminal 1B designates the block number #259999 obtained by subtracting "1" from #26000 and inquires of the distributed ledger. Since the token ID: 0005 is not updated from #25771 to #259999 in the state DB of #259999, although not illustrated in FIG. 4, the state of #259999 with regard to the token ID: 0005 is the same as the state DB 52 of #25770. Accordingly, the user terminal 1B acquires the address of user A which is the owner address and #25770 which is the update block number with reference to the state DB of the distributed ledger of #259999. Thus, user B can confirm that the previous owner of the token ID: 0005 is user A and the owner is changed to user A with the block of #25770.

If the user terminal 1B desires to search for the past history, the processing of S18 and S19 is repeatedly performed. Thus, user B can efficiently track the past history of the token.

According to the above-described embodiment, the blockchain system includes the user terminal 1 and the approval terminal 2. The user terminal 1 includes the transaction issuing unit 13 that issues a transaction in which the value of the state (the variable) of the smart contract is updated. The approval terminal 2 includes the block generation unit 153 that generates a block including the transaction and updates the value of the state, and reflects the block and the update block number of the block in which the value of the state is updated to the distributed ledger 11 of each of the terminals of the blockchain system.

In this way, in the embodiment, in the state DB of the distributed ledger 11 of each terminal, the update block number of the updated block is granted to the value of the updated state at a time point at which the value of the state of the smart contract is updated. Thus, the user can easily track the history of the data on the distributed ledger (the blockchain) by tracing the update block number without referring to all the past blocks and the transactions. That is, in the embodiment, the past history and the transition of the value of the state of the smart contract can be easily acquired.

In the embodiment, traceability can be improved for the user of the smart contract. The state DB of the related art does not hold information indicating at which block in the past, the value of the state is updated or changed, and it is not easy for a user to know a time point of a certain block at which the value of the state transitions. In the related art, to know a change block number, it is necessary to search all the blocks or transactions, which imposes a large load on the user. Thus, in the embodiment, it is possible to improve traceability of a state by adding a block number at the time of generating a block (at the time of mining) to the value of the state which the user desires to trace as a change point of the value of the state in the state DB.

As the user terminal 1 and the approval terminal 2 described above, for example, a general-purpose computer system that includes a central processing unit (CPU), a memory, a storage (a hard disk drive (HDD) or a solid-state drive (SSD)), a communication device, an input device, and an output device can be used. In the computer system, a predetermined program loaded on the memory is executed by the CPU to realize each function of each device. For example, functions of the user terminal 1 and the approval terminal 2 are realized when the CPU of the user terminal 1 executes a program for the user terminal 1 and the CPU of the approval terminal 2 executes a program for the approval terminal 2 respectively.

The program for the user terminal 1 and the program for the approval terminal 2 can be stored in a computer-readable recording medium such as an HDD, an SSD, a USB memory, a CD-ROM, a DVD-ROM, or an MO and can also be delivered via a network.

The present invention is not limited to the foregoing embodiment and various modifications can be made within the scope of the gist of the present invention.

For example, in the embodiment, the approval terminal 2 sets the block number of the block in which the value of the state is updated as the update block number to the state DB. However, instead of the update block number, the searching block number can be set to the state DB. That is, instead of the update block number, the approval terminal 2 may set the searching block number obtained by subtracting "1" from the update block number to the state DB. In this case, when the past history of the state is acquired (S18 of FIG. 5), the user terminal 1 can track the past history using the searching block number acquired from the distributed ledger as it is without calculating the searching block number from the update block number.

In the state DB according to the embodiment, as illustrated in FIG. 4, one state (the owner address) is kept and one update block number corresponding to the state is kept. However, in the state DB, a plurality of states may be kept. In this case, when each of the plurality of states can be traced, the state DB has an update block number for each state.

REFERENCE SIGNS LIST

1 User terminal
2 Approval terminal
11 Distributed ledger
12 Blockchain control unit
13 Transaction issuing unit
14 History searching unit
15 Block issuing unit
151 Consensus execution unit
152 Transaction verification unit
153 Block generation unit
4 Blockchain network

The invention claimed is:
1. A blockchain system comprising: a user terminal; and an approval terminal, wherein the user terminal comprises:
a first memory storing one or more first programs, and a first hardware processor configured to execute the one or more first programs to perform:
issuing a transaction for updating a value of a variable of a smart contract, and wherein
the approval terminal comprises:
a second memory storing one or more second programs, and a second hardware processor configured to execute the one or more second programs to perform:
generating a block including the transaction and updates to the value of the variable, and
reflecting the block and a block number of the block to a distributed ledger in the blockchain system, wherein the distributed ledger comprises a state database that stores, for each token in a set of tokens of the smart contract, a key-value data structure comprising (i) a respective token ID, (ii) a respective value for the variable, and (iii) a respective update block number which identifies a respective block that includes a respective transaction in which the respective value of the variable was updated,
wherein the first hardware processor of the user terminal is configured to further perform:
acquiring the update block number from the distributed ledger of the user terminal, designating a searching block number calculated from the update block number, and acquiring the value of the variable and the update block number in the block at a time point of the searching block number from the distributed ledger of the user terminal, wherein the searching block number is calculated by subtracting 1 from the update block number.
2. The blockchain system according to claim 1, wherein the second hardware processor is configured to reflect the searching block number calculated from the update block number to the distributed ledger.
3. An approval terminal configured to approve a transaction in a blockchain system, the approval terminal comprising:
a memory storing one or more programs, and a hardware processor configured to execute the one or more programs to perform:

receiving the transaction to update a value of a variable of a smart contract; and generating a block including the transaction and updates to the value of the variable, and reflecting the block; and updating an update block number of the block to a distributed ledger in the blockchain system, wherein the distributed ledger comprises a state database that stores, for each token in a set of tokens of the smart contract, a key-value data structure comprising (i) a respective token ID, (ii) a respective value for the variable, and (iii) a respective update block number which identifies a respective block that includes a respective transaction in which the respective value of the variable was updated, wherein the update block number is used to designate a searching block number calculated from the update block number, and to acquire the value of the variable and the update block number in the block at a time point of the searching block number from a distributed ledger of a user terminal, wherein the searching block number is calculated by subtracting 1 from the update block number.

4. A user terminal in a blockchain system, the user terminal comprising:

a memory storing one or more programs, and a hardware processor configured to execute the one or more programs to perform:

storing a distributed ledger of a blockchain;

issuing a transaction to update a value of a variable of a smart contract; wherein:

the distributed ledger comprises a state database that stores, for each token in a set of tokens of the smart contract, a key-value data structure comprising (i) a respective token ID, (ii) a respective value for the variable, and (iii) a respective update block number which identifies a respective block that includes a respective transaction in which the respective value of the variable was updated; and the hardware processor is further configured to acquire the update block number of the block in which the value of the variable is updated from the distributed ledger, designate a searching block number calculated from the update block number, and acquire the value of the variable of the smart contract and the update block number in the block at a time point of the searching block number from the distributed ledger, wherein the searching block number is calculated by subtracting 1 from the update block number.

* * * * *